Nov. 23, 1926.
F. T. BOYDSTON ET AL
1,608,199
CHECK WRITER
Filed Nov. 13, 1925    10 Sheets-Sheet 1
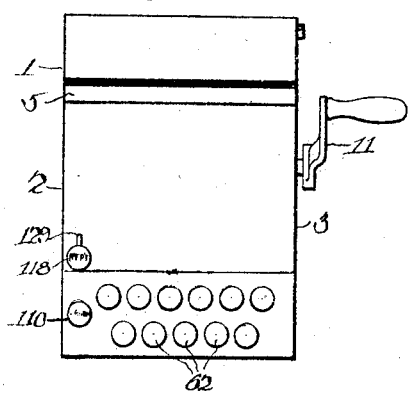
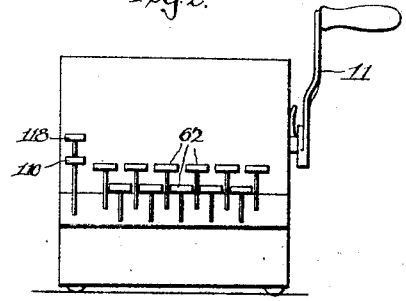
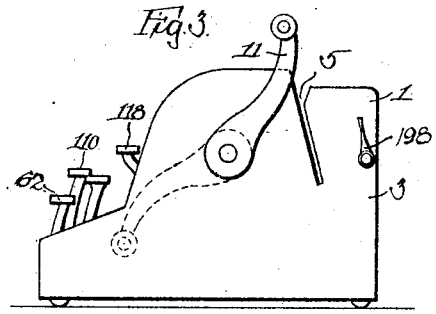
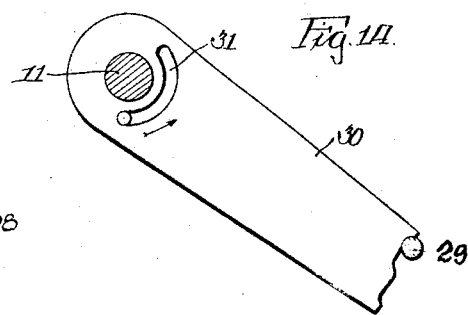
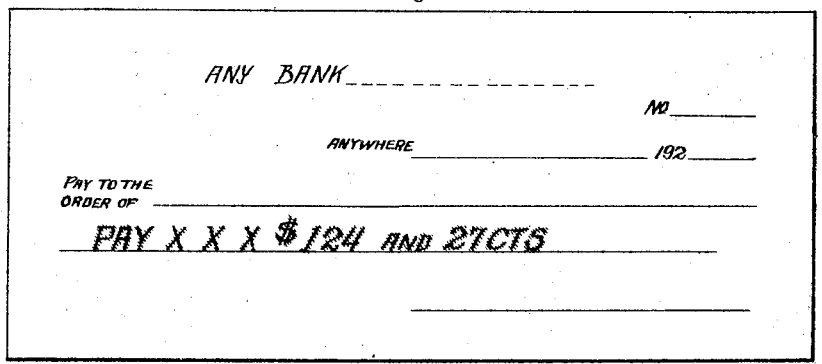

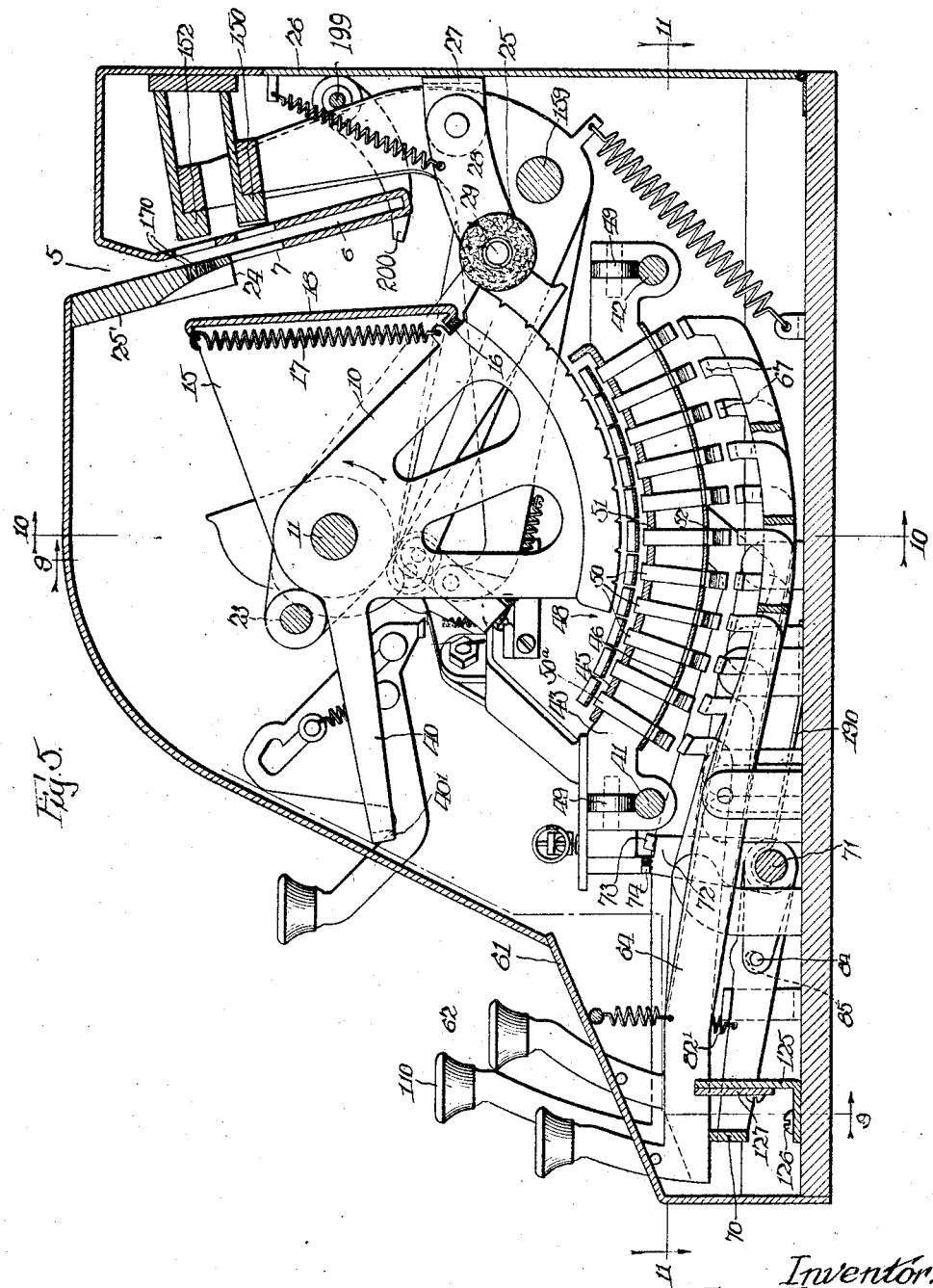

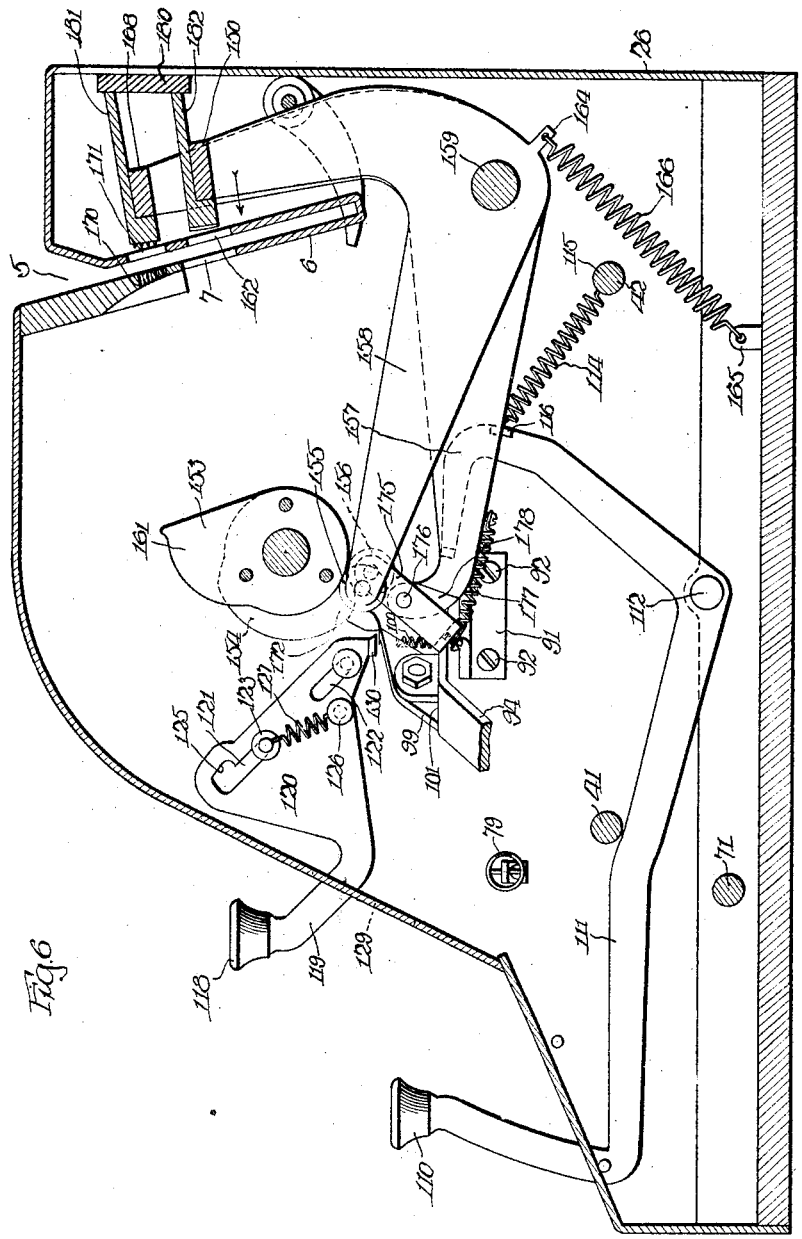

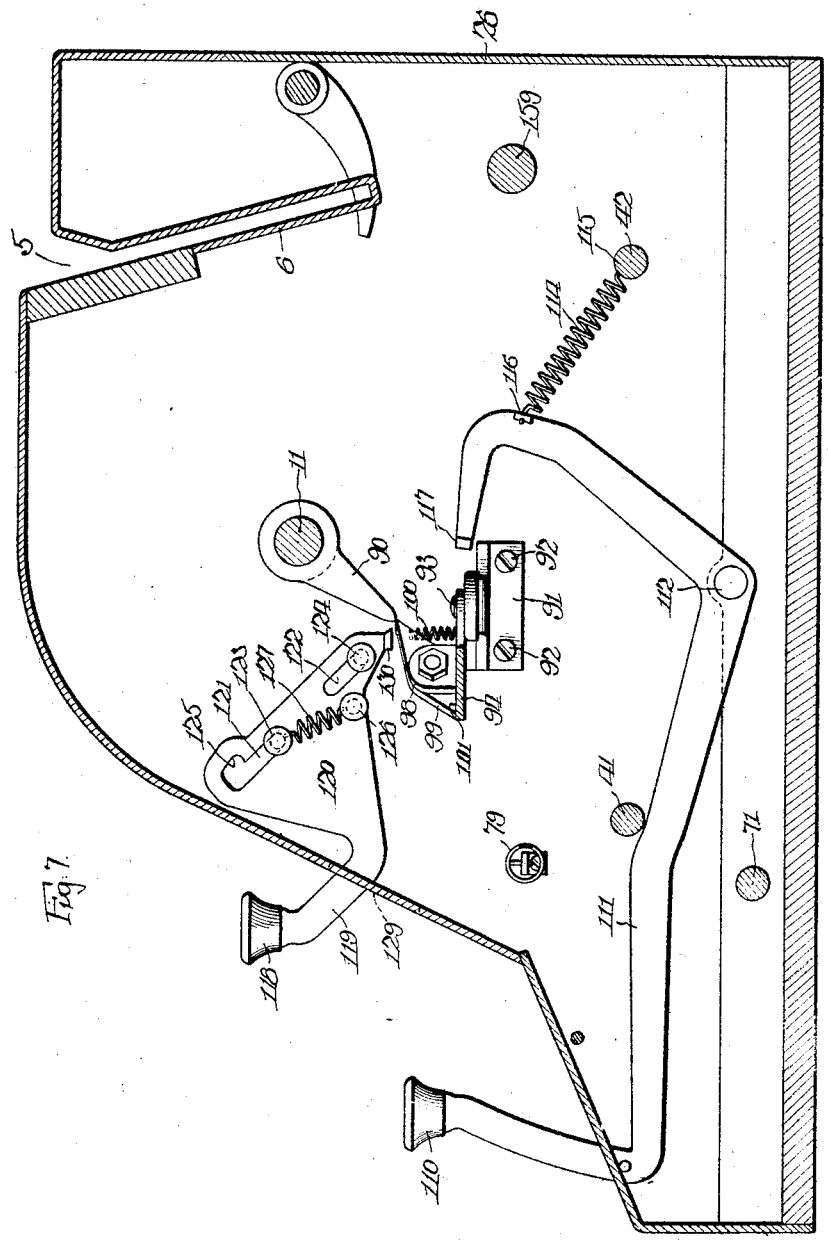

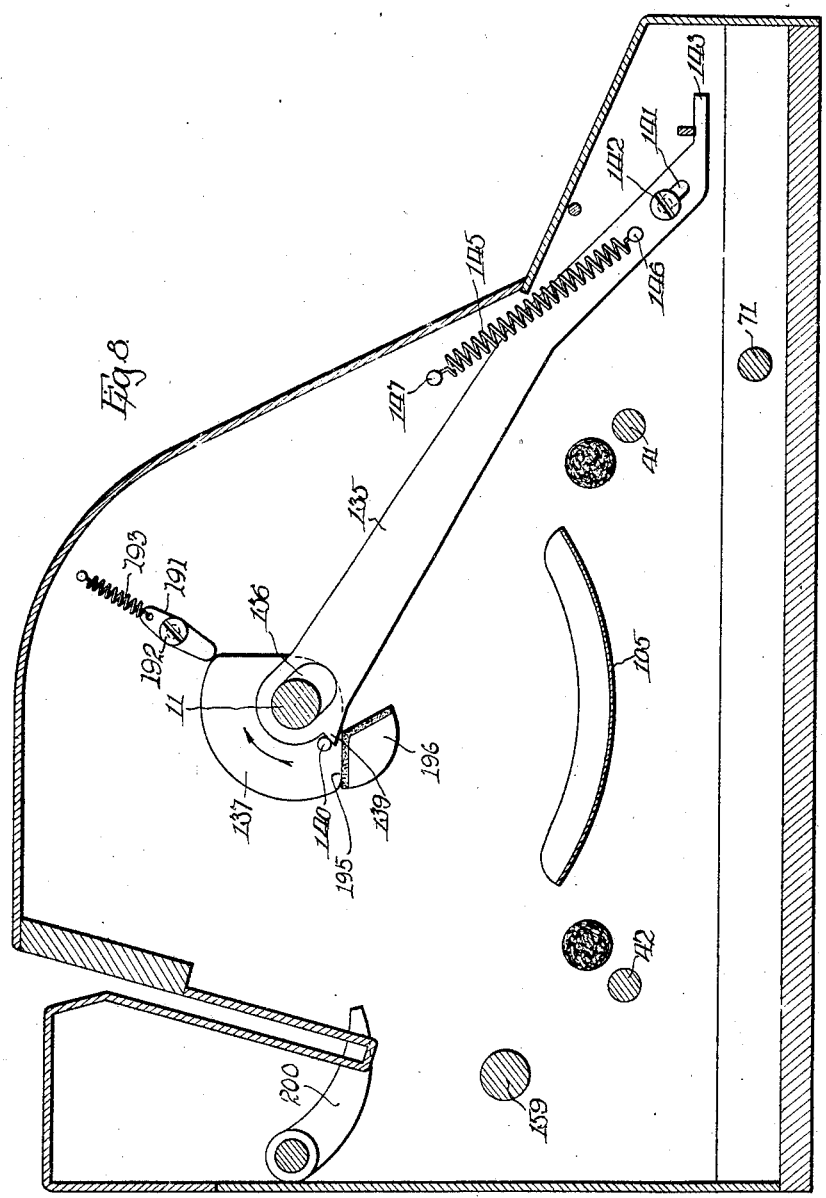

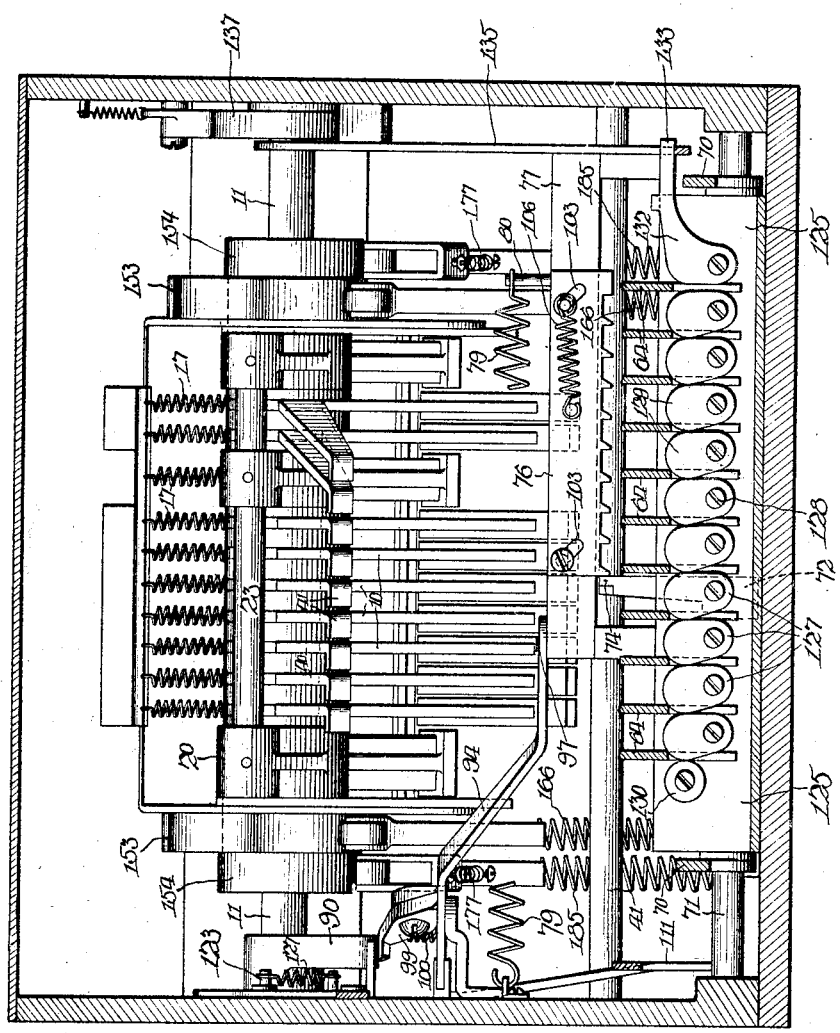

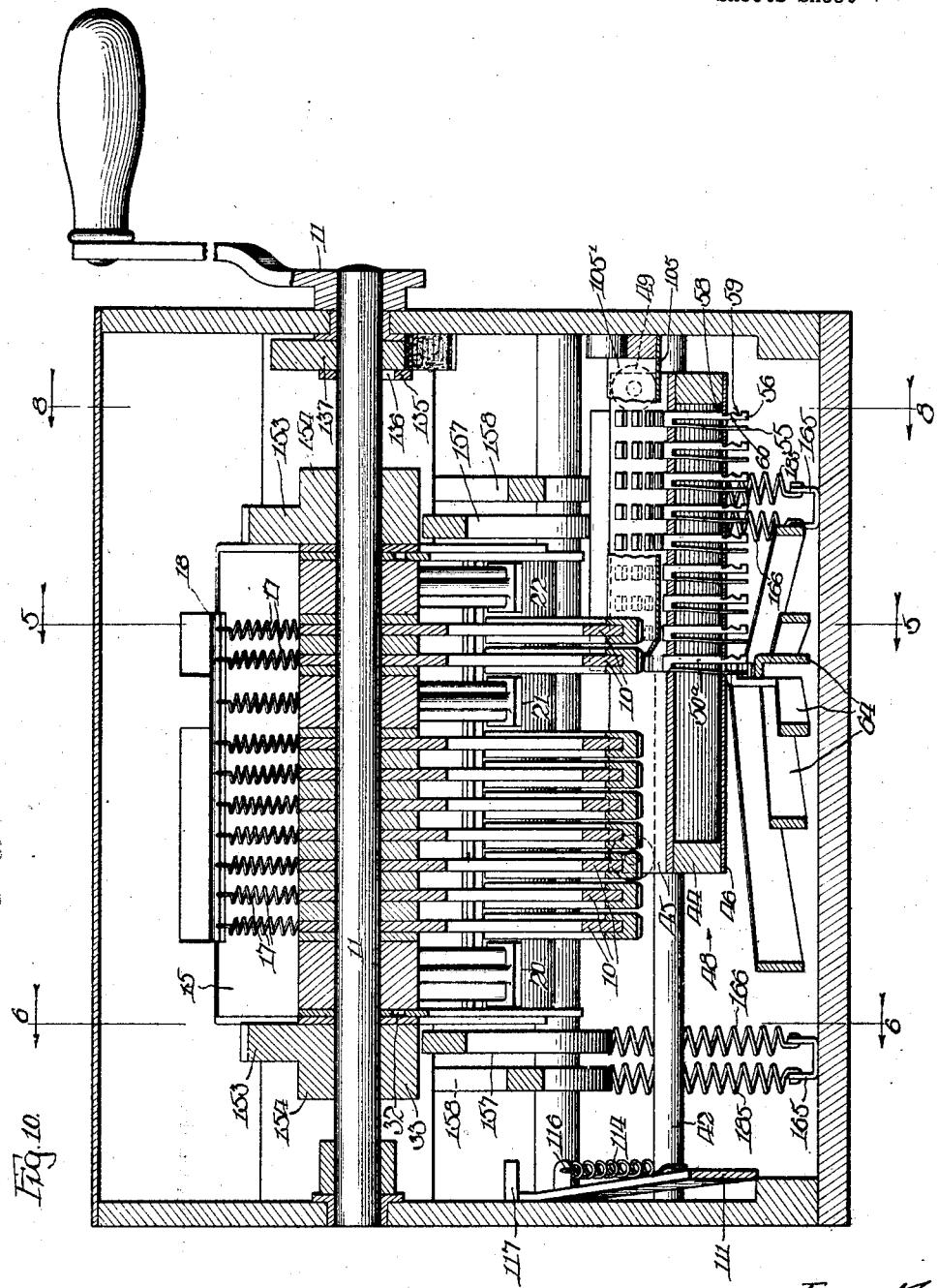

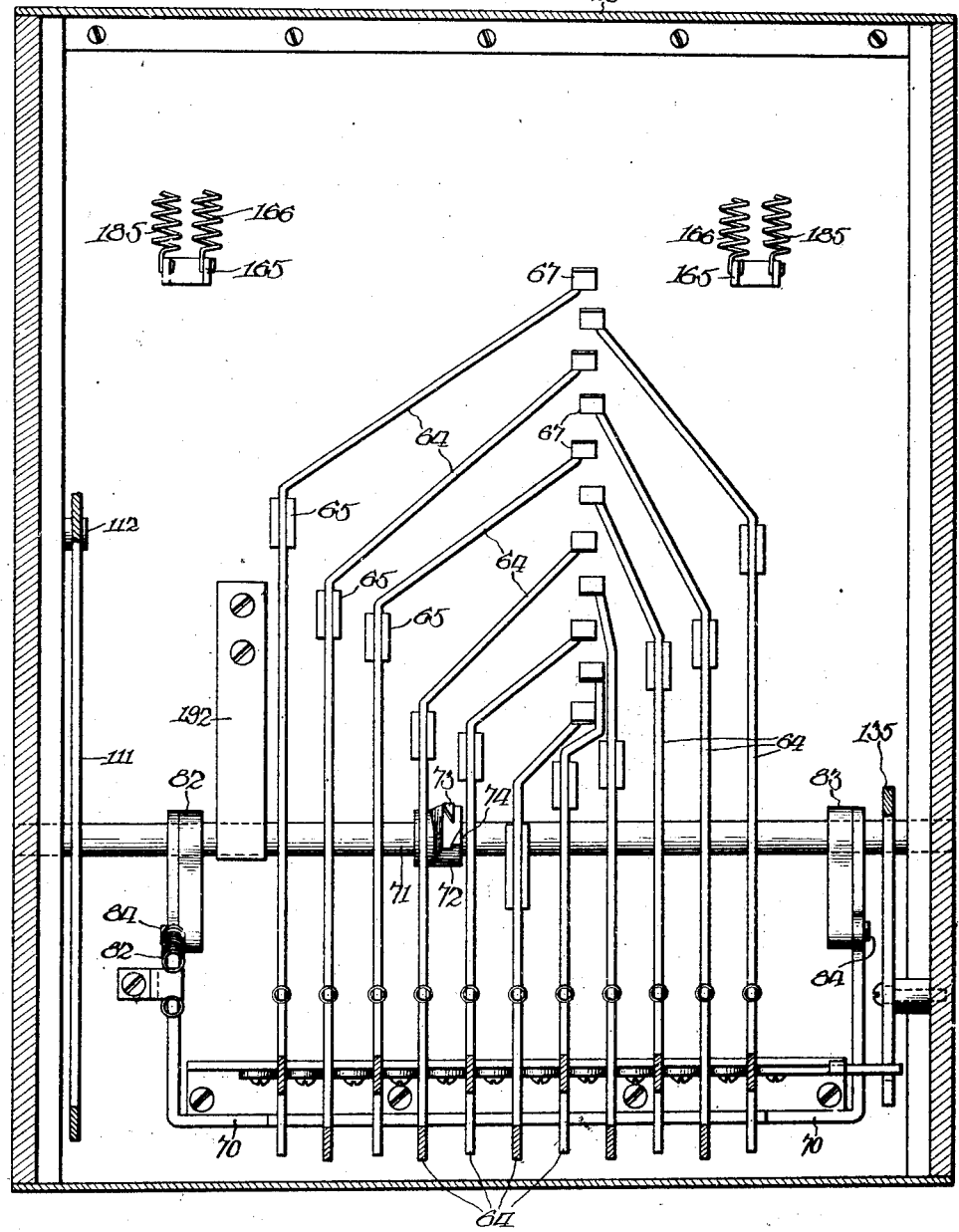

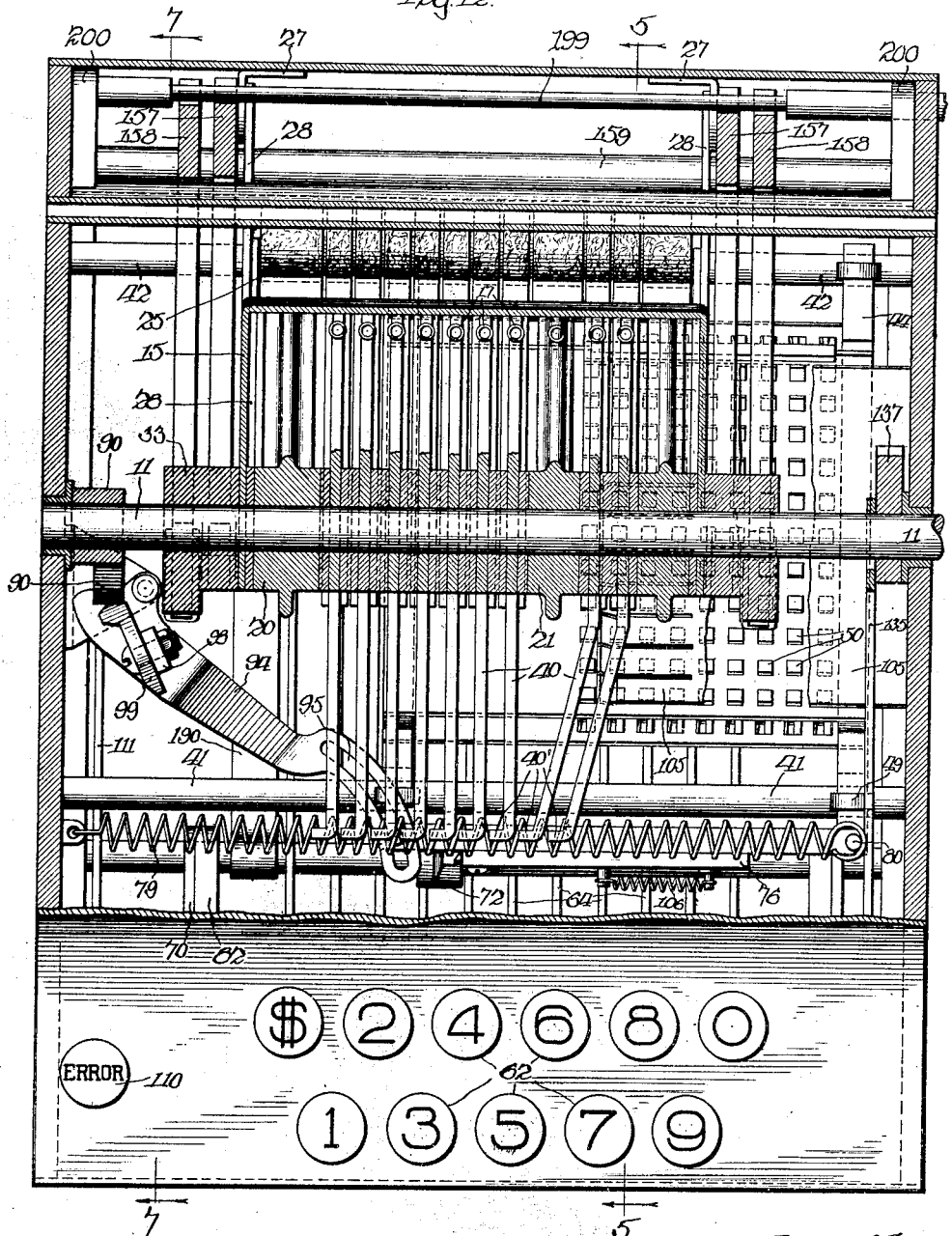

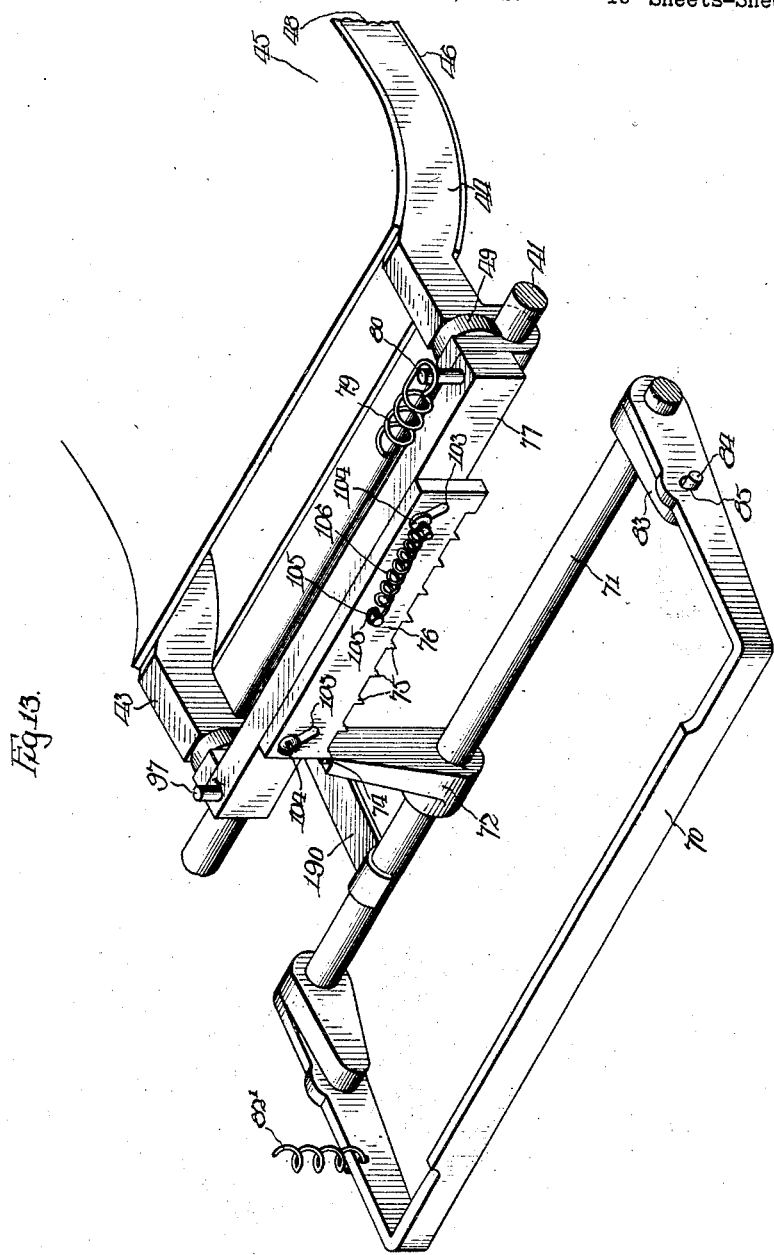

Patented Nov. 23, 1926.

1,608,199

UNITED STATES PATENT OFFICE.

FRANK T. BOYDSTON AND EDWIN W. WILSON, OF CHICAGO, ILLINOIS; SAID WILSON ASSIGNOR TO SAID BOYDSTON.

CHECK WRITER.

Application filed November 13, 1925. Serial No. 68,828.

The invention relates to check protectors which are used for marking or impressing upon the face of a check, draft or other negotiable instrument, the amount for which the instrument is payable, and has for its object certain improved constructions and modes of operation which will be more fully set forth hereinafter.

Heretofore in the art it has been customary to provide a structure wherein the type carrying members are each adapted to be manually set for bringing the printing characters into line, and, either by advancing the check against the type, or by moving the type against the check, the printing operation may be completed. It is obvious that inaccuracies in aligning the type carrying members will inevitably occur and an imperfect impression on the check will result. Where type members have a number of positions it is apparent that registering stops have little value, and, in fact, are not practical and seldom used. A small fraction of an inch out of alignment—a distance rarely noticeable to the average observer—may render the impression useless. It is particularly true for this kind of printing, as it is necessary to prevent alteration of the impression after once made. As a practical matter, a machine is required which will provide a perfect and clean-cut impression.

The present invention consists of a novel construction of check protector wherein a key board is provided to furnish a number of keys for selectively engaging means capable of limiting the movement of the type carrying members in their movement by the operating handle whereby in one stroke of said handle the printing characters are brought into line and impressed upon the check. This operation is obviously superior to the present day method of aligning the type carrying members, because in the present instance, it might be said that alignment is automatically accomplished, inasmuch as the movement of the type carrying members into printing position is dependent upon the operation of the handle.

A further object of the invention is the provision of cooperating key locking means, which permit the actuation of the keys one at a time, so as to prevent the occurrence of an error by striking more than one key at the same time. By virtue of this provision the act of operating one of the keys automatically locks the other keys against movement, and should two or more keys be simultaneously engaged for actuation, it will be impossible to depress any one of them an effective distance to cause operation thereof.

A still further object of the invention resides in a construction embodying an additional key locking mechanism cooperating with the operating handle whereby it is impossible to actuate the keys while the machine is in operation. This requires that the operating handle to be in its position of rest so that actuation of the keys at all other times is effectively prevented in order to minimize the occurrence of an error in the use of the check protector.

It is within the scope of the present invention to provide a novel mechanism which compels a full operation or stroke of the operating handle so as to prevent an incomplete impression or printing operation.

So far as it is known at this time, the present invention is first to employ in a check protector of the type disclosed, mechanism for automatically advancing the printing characters toward the check immediately after the type carrying members have been made to align the printing characters by the single operation of an operating handle. That is to say, after the actuation of the keys, in which no skill of the attendant in aligning the type members is relied upon, the movement of the operating handle completes the entire operation of the machine, the type members first aligning the printing characters and then advancing the check to impress or print the characters thereon.

A still further object of the invention consists of a novel construction of check protector having keys for selecting the printing characters whereby an error key will be provided for making it possible to correct an error occurring in the actuation of the keys without operating the machine.

The invention also contemplates a mechanism which enables the operator to lock the keys actuated whereby any number of impressions or prints may be made from a single selection or setting. This is accomplished by use of what is termed a repeat key. Cooperating with the repeat key is a novel type of lever mechanism capable of temporarily disabling the key resetting mechanism to permit the setting obtained to remain until the repeat key is released.

It will be remembered that an improved form of impression or printing is provided herein. The type elements are adapted to cooperate with a platen bar for effecting, in a combined operation, the printing and the embossing of the print into the check whereby the impression is cut into the paper to allow the ink to simultaneously penetrate the fiber thereof and produce a permanent impression.

Also, it is within the scope of the present disclosure to perforate the name of the payee in order to prevent erasure or alteration of the same. It is preferable to so relate this operation that the printing mechanism will first grip the check and print thereon. While the type members are aligning the printing characters with the printing line, the platen bar will advance, but engagement with the check is not effected until the aligning of the printing characters has been completed. However, before the platen bar returns, the perforating mechanism will advance and engage the check so that the check will remain gripped during the operation of the machine.

Other objects and advantages of the invention will be apparent from the following description:

In order to apprise those skilled in the art how to construct and practice our invention, we shall now describe an embodiment thereof in connection with the accompanying drawings, which prove a part hereof.

In the drawings:

Figure 1 is a top view of a check writer embodying the invention;

Fig. 2 is a front elevation of the same;

Fig. 3 is a view of the right hand side, illustrating the operating handle and a check receiving slot;

Fig. 4 is a view of a check having been printed, embossed and perforated with my improved check writer;

Fig. 5 is a transverse vertical section of the machine, the view being taken along the line 5—5 of Fig. 12;

Fig. 6 is a similar view, but illustrating in detail the cooperative relation between the operating cams on the handle and the frames for carrying the perforating bar and embossing platen bar;

Fig. 7 is a detail view of the error key and the repeat key, and their associated mechanisms, this view being taken along line 7—7 of Fig. 12;

Fig. 8 is a detail view of the mechanism for effecting the locking of the keys during the combined printing and embossing operation and the perforating operation, this view being taken along line 8—8 of Fig. 10;

Fig. 9 is a view taken along line 9—9 of Fig. 5;

Fig. 10 is a sectional view taken along line 10—10 of Fig. 5;

Fig. 11 is a detail view of the key operated levers, being taken along line 11—11 of Fig. 5;

Fig. 12 is a horizontal sectional view taken through the plane of the operating handle;

Fig. 13 is a perspective view of the mechanism employed to shift the stop pin carriage; and Fig. 14 is a detail view of the device employed to move the inking pad into contact with the selected printing characters just prior to the printing operation.

The check writer embodying the present invention comprises a substantially rectangular casing 1, preferably fashioned from any suitable metal, or the like, the side walls 2 and 3 and the top face 4 of which are slotted at 5 to receive a check, draft or other negotiable instrument as will be hereinafter described. Slot 5 is preferably formed almost vertical so that a check upon being inserted will fall into the slot and will be more quickly aligned for the combined printing and embossing operation and the perforating operation than if in another position, say for instance horizontally, because the check of its own accord tends to maintain its proper position relative to the parts engaging the check for performing these operations. Furthermore, if the check is disturbed slightly, it will fall back by gravity to the position provided for it in the slot.

The front wall 6 of printing slot 5 is provided with a transverse opening 7 and in front of this slot the printing characters on a plurality of type segments 10 are adapted to be brought into selective registration for printing an impression upon the check. Type segments 10 are mounted upon an operating handle 11 for swinging movement into and out of registration with slot 5 whereby to bring each of the various printing characters on these type segments selectively in front of slot 5 at different times. Key actuation has been found to be a convenient method of operation for selectively arranging the position of each type segment 10 so as to align the desired type character thereon with the printing line. While key means has been mentioned and will be described later on, it will nevertheless be apparent that other forms are desirable and may be used to limit the movement of these type segments 10 in order to align the desired printing characters thereon for a printing operation.

It is preferable to group type segments 10 together midway on the operating handle 11 and to permit movement relative thereto. Operating handle 11 is suitably journaled in the sides 2 and 3 of casing 1. By referring to Figures 5 and 12 it will be noted that a frame 15 of U formation is preferably fixed to operating handle 11, so as to rotate therewith. Between the parallel arms of the U frame 15, the type segments 10 are adapted to be located, in loosely mounted relation, but tending to abut against the inner-most edge 16 of the transverse arm 18 of U frame 15, being held thereagainst by a series of springs 17. Transverse arm 18 resembles a plate having the edge 16 at its lower end, when viewed from the position illustrated in Figure 5. Edge 16 may be of shock absorbing material so as to deaden any clicking or other noise as the result of these type segments coming against the edge 16 during the operation. Certain of the type segments denoted specifically as 20, 21 and 22 in Figures 9 and 12 are interconnected together by a rigid bar 23, so as to operate as a unit, and have a closer fit with operating shaft 11. By having a closer fit with the shaft, these certain type segments tend to move with the shaft when the latter is rotated, but their movement is arrested by shoulder 24 formed on the lower edge of a transverse bar 25′. These segments are preferably not arcuate in formation as the other segments.

As the check blanks, drafts and the like, now in general use, are provided with a blank space with the word dollars printed at one end thereof, the type segment 22 is adapted to work or impress upon the check the word "cents." The intermediate type segment is adapted to provide the word "and" between the amount in the dollar spaces and the amount in the cent spaces. It is obvious that the type segments between the segments 21 and 22, when provided with printing characters of digits between 0 and 9, will together print or impress any hundredth part of a dollar, being preceded by the word "and" and followed by the word "cents." Each of the type segments to the left of type segment 21 is provided with digits 0 to 9, the digit 1 being preceded by some suitable spacing characters, so that when an amount of less figures than the total number of segments provided is required upon the check, the spaces to the left of the amount will be suitably marked or embossed by spacing characters, thereby preventing alteration of the check by placing additional digits to the left of the amount before the word "Pay" printed by the type segment 20. Each of these segments to the left is also adapted to have the "$" type character thereon, so that it will print the same immediately before the farthest digit to the left that will be printed for the amount to be indicated.

The movement of the operating handle 11, which includes the transverse portion between the side walls 2 and 3 of housing 1, is illustrated in Figure 3. In this figure the full line position indicates the starting point and the dotted line position illustrates when the end of the down stroke is reached. As the operating handle 11 is moved downwardly the segments move upwardly in the direction of the arrow shown in Figure 5. During this advancing movement, in which the selected printing characters on the various type segments align with the opening 7, which is the printing line, an inking pad or roller 25 moves forward to contact with the type.

Inking roller 25 may be carried upon the inside of a door 26 at the rear of casing 1 in order to facilitate access thereto for re-inking or replacing the same when necessary. Angle irons 27 in the form of brackets are secured to the door and movably receive, in pivotal relation, side bars 28 at the inner ends thereof. As viewed in Figures 5 and 12, the side bars 28 are at the ends of inking roller 25 and are mounted to support a transverse shaft 29 upon which the roller is carried. By referring to Figures 5 and 14, a short bar 30 loosely mounted on the operating handle 11 will be noted. Adjacent to handle 11, an arcuate slot 31 is furnished in bar 30. This slot is adapted to receive a pin 32 on a cam 33 which is fixed to operating handle 11. As the handle 11 is rotated, the pin 32 will ride in the slot. The surface of the lower end of lever 30 is formed irregular so that movement of lever when pin 32 reaches either end of slot 31 will cause transverse shaft 29 to vary the position of the inking roller 25 relative to the printing characters on the type segments. It will be later noted that inking roller 25 advances toward the type to ink the same, just prior to the printing operation. Thereafter, the inking roller is moved out of contact with the type.

Each of the type segments, with the exception of those designated 20, 21 and 22 are provided with fingers 40 with lateral bends 40′ at the tips thereof. These fingers cooperate with the mechanism, which will now be described for selectively positioning the printing characters, which are to be aligned with the printing line, for impressing upon the check.

A pair of transverse rods 41 and 42 are rigidly secured between the side walls 2 and 3 of casing 1. By referring to the various figures, particularly Figs. 5, 12 and 13, it will be observed that a pair of longitudinal bars 43 and 44 are slidably mounted at their ends by means of anti-friction rollers 49 rolling upon these transverse rods 41 and 42. Bars 43 and 44 are of arcuate formation intermediate their ends. This intermediate portion is adapted to have secured thereto, upper and lower plates 45 and 46, which are also formed arcuate, and which, together with the slidable bars 43 and 44, constitute a shiftable carriage 48 carrying a plurality of stop pins 50. The arcuate formation of both these plates and that of the type segments have been designed so as to have a common center point, which, in this instance, is the axis of operating handle 11. The stop pins 50 may then lie radial with respect to the handle, as shown in Fig. 5, but this is not necessary. As a consequence, with the shiftable carriage 48 disposed in close proximity below the type segments, the latter will move in a plane parallel with the upper surface of the carriage. A plurality of novelly formed stops or stop pins 50 are adapted to be projected upwardly from the carriage 48 to serve as a means for selectively limiting the rotative movement of the various type segments whereby to selectively align the desired printing characters thereon with the printing line 7. The upper and lower plates 45 and 46 are perforated, or otherwise furnished with a plurality of openings 51 and 52, through which the stop pins are adapted to be projected. It will, of course, be understood that the pins 50 will, in their normal position, project or lie in these openings, but, when actuated by the key means, which will be hereinafter described, are adapted to move upwardly and project a greater distance from the upper openings 51 and plate 45, and preferably lie in the path of fingers 40 on the type segments. The number of rows or series of stop pins 50 will equal the number of type segments, with the exception of segments 20, 21 and 22. The number of stop pins 50 in each series will equal the number of printing characters which can be made to align selectively with printing line 7.

The particular type of stop pins 50 employed herein is to be noted. By referring specifically to Fig. 10, wherein these pins are clearly shown, it will be seen that the lower end of each is bifurcated, or otherwise slotted longitudinally to provide resiliency to the two legs 55 and 56, thereby enabling the same to be movably held in the openings 51 and 52 of the carriage 48. The outer edge of the leg 56 is notched, or otherwise shaped so that a predetermined force applied upwardly at the bottom thereof will move each pin upwardly a limited distance without being completely displaced. This notched formation furnishes two shoulders 58 and 59 and an intermediate hump 60. When this predetermined force is applied in the direction stated, both legs 55 and 56 will yieldably come together, thereby permitting the hump 60 to ride over the adjacent edge of lower opening 52. Shoulder 59 then functions to limit further upward movement by engaging against the edge of the opening. Thus each stop pin is selectively raised and the means for accomplishing this feature will now be described.

Casing 1 is provided with a key board 61. Extending from the key board 61 are a plurality of keys 62 adapted for vertical actuation in order to bring about the selective movement of said stop pins 50. Any number of keys may be provided, but it will be apparent to those skilled in the art that it is preferable for each key to be represented by a printing character on each of the type segments provided.

Keys 62 are conveniently carried at the outer ends of spring pressed key levers 64. By referring to Figure 11, the approximate relation of the key levers 64 will be noted. These levers are pivoted at different points within the casing by a plurality of upstanding lugs 65. The inner ends of levers 64 are angularly bent toward a common center, whereby these ends lie approximately in a straight line, so as to selectively engage any pin of either series. The manner in which such selective engagement occurs may be clearly seen in Figure 5. The lower ends of legs 55 and 56 of pins 50 lie over the headed ends 67 and are adapted to be engaged by the latter when keys 62 are depressed. Key levers 64 are so arranged that their pivotal action about the lugs 65 will be just sufficient for the headed ends 67 to move stops 50 their maximum distance upwardly. It is preferable to align headed ends 67 with each other, in a straight line, so that they will also align with all the stop pins of a single row or series. The actuation of any key, say for instance the key numbered 5 in Figure 12, will cause its lever to be depressed at its forward end and to be raised at its rear end, thereby engaging the first of the stop pins of the series aligning with headed ends 67. In order to make the explanation of this action clear, the stop pin which would be raised by the key 5, is designated 50$^a$ in Figures 5 and 10. Its raised position is shown in dotted lines in Figure 5. As many keys 62 as needed, in order to make the desired impression are thus actuated to bring stop pins, corresponding to the printing characters to be used, in the path of type segments 10. By such an arrangement, the rotation of the type segments selected by the raised stop pins, is then arrested at the proper period, whereby the printing characters to be selected are brought to align with the printing line 7. Mechanism is employed, however, to shift the pin carriage 48 after each operation of a key so that a succeeding row or series of stop pins 50 will be brought over the headed ends 67 of key levers 64. It will be obvious that the principle of operation of the check writer disclosed herein is simple and practical, as it merely involves a simple selection of any combination of printing characters by actuating certain finger operated keys, which, in turn, select one or more stop pins so positioned that the movement of type segments are individually arrested thereby so as to bring printing characters on the segments into alignment with a printing line.

The mechanism for progressively shifting the stop pin carriage comprises a U bar 70 disposed in contactual relation below the forward end of the key levers 64. By referring particularly to Figures 5 and 13, it will be observed that bar 70 is adapted for a limited rocking movement about the ends of a transverse rod 71 suitably journalled, say in the sides 2 and 3 of casing 1. This rocking movement is imparted to rod 71, which, in turn, rocks a pawl 72 fixed to the rod. Teeth 73 and 74 are furnished on the upper end of pawl 72, which teeth cooperate with teeth 75 disposed on the under side of a rack bar 76. Rack bar 76 is mounted on a cross bar 77. As before mentioned, the bars 43 and 44 of carriage 48 are slidably mounted on transverse rods 41 and 42. To the ends of bars 43 and 44, the rack bar 76 is fastened, for a suitable mounting on carriage 48. A coil spring 79 tends to move the carriage 48 to the left. A pin 80 projects from bar 77 to receive one end of spring 79. The other end of this spring may be attached to any suitable point, such as, for example, to one side of housing 1.

A vertically arranged coil spring 82' has one of its ends fixed at 83 to an arm of U bar 70. The other end of this spring may be fixed to the housing. The action of spring 82' is to hold U bar 70 in constant contact with the under side of the forward ends of the key levers 64. Actuation of any of the keys forces the bar 70 downwardly to impart a rocking movement to rod 71 and consequently to finger 72. In order that there will be an inter-related action between the movement of the stop pins 50 and the shifting of carriage 48, so as to insure projection of one of the pins before the carriage is shifted, a lost motion connection is provided between U bar 70 and shaft 71. Said lost motion connection comprises two arms 82 and 83 fixed to rock with the shaft 71, the outer ends of these arms having pins 84 projecting into elongated slots 85 in U bar 70. Normally, when bar 70 is held against the underside of key levers 64 by coil spring 82', pins 84 will lie at the bottom of the elongated slots 85. However, when the bar 70 is depressed by one of the keys 62, the first part of the motion is lost at the slots 85, and consequently, a complete movement of the key is required before rock shaft 71 is operated. The latter part of the key movement is readily imparted to the rock shaft when the top of elongated slots 85 reaches the pins 84 to carry them downwardly until the end of this movement is completed. This requires the ends of U bar 70 loosely to engage the shaft 71.

The manner in which teeth 73 and 74 on pawl 72 engage and disengage teeth 75 on rack 76 to allow carriage 48 to shift, will now be described. Normally, the tooth 74 engages the teeth 75. However, when the shaft 71 is rocked by the actuation of one of the levers 62, the pawl 72 is thrown outwardly a distance sufficient to withdraw tooth 74 and bring tooth 73 into engagement with the tooth 75, engaged by tooth 74. But releasing the key will return the rock shaft and pawl, thereby disengaging tooth 73 with this tooth 75 and bringing tooth 74 in the path of the next succeeding tooth 75. The carriage 48 will advance to the left under the action of spring 79 until stopped by the next tooth 75 engaging with tooth 74 which has by this time returned to its normal position.

In order to assure that there will be no accidental actuation of the keys, it is preferable to provide a braking element in the form of a spring 190 resiliently engaging the rock shaft 71 and tending to restrain its free movement.

After the printing operation is accomplished by the check writer shown herein, the stop pin carriage 48 returns to its original position. The mechanism for returning the carriage will be now described.

Referring now to Figs. 7, 12 and 13, it will be observed that a cam 90 is furnished to rotate with the operating handle 11 at one end thereof. Located under cam 90 is a bracket 91 secured to the side of housing 1 by screws 92, and on this bracket is provided a pivotal mounting at 93 for a return lever 94. As clearly shown in Figs. 9 and 12, return lever 94 projects a short distance forwardly, then downwardly at an angle and finally terminating with a horizontal portion having a slightly arcuate elongated slot 95 provided therein. At the adjacent end of cross bar 77, a vertical pin 97 passes through and rides in elongated slot 95. Hence, it will be noticed that a swinging movement of return bar 94 to the right will return stop pin carriage 48 to its original position for a subsequent printing operation. An upstanding lug 98 (see Fig. 7) is furnished on return bar 94 near its pivotal mounting 93. A spring controlled latch 99 is pivotally connected to lug 98. One end of latch 99 is pointed and is extended in the direction of cam 90. A spring 100 tends to hold this pointed end upwardly in its extended position whereby to hold the opposite end 101, which is cut flat, against the upper face of return bar 94. Cam 90 is so positioned on operating handle 11 that it will engage latch 99 at the end of the printing operation. Such engagement depresses latch 99 temporarily to permit cam 90 to pass. As soon as the operating handle 11 starts to return, however, the tip of cam 90 engages the latch 99 at the under side of its pointed end. But the latch is locked against pivotal movement in this direction. Consequently the latch 99 is displaced from the path of cam 90 by an action which swings the return lever 94 about its pivotal mounting 93. Such swinging movement forces the return lever 94 to the right, thereby causing the stop pin carriage 48 to return to normal position.

In order that teeth 75 will clear teeth 73 and 74 on ratchet 72, when carriage 48 returns to its original position at the right of the machine, rack bar 76 is mounted in a manner permitting it to be temporarily displaced as each tooth 75 moves over the teeth 73 and 74. Diagonal slots 103 are cut in rack bar 76. Pins 104 mounted in cross bar 77 ride in the slots 103. A spring 106 is connected at one end to a stud 105 and at the other end to a pin 104. Spring 106 tends to hold rack bar 76 in the position illustrated in Fig. 13. But, when the carriage 48 is returned to original position, the engagement between teeth 73 and 74 and teeth 75 temporarily displaces the rack bar 76 in a vertical direction. Bar 76 is forced upwardly on the pins 104 riding in the slots 103. In each instance, however, the spring 106 returns the rack bar 76 to its normal position.

A pin return plate 105' is provided at the right hand end of the machine to depress all the stop pins 50, which had been projected for the printing operation, when the carriage 48 returns to normal position. The action of this pin return plate 105' is clearly illustrated in Figs. 10 and 12.

When the shiftable pin carriage 48 is moved to the right by lever 94 through the pin and slot connection shown herein, against the action of spring 79, the carriage will not come to rest, or to its normal starting position for a subsequent operation, until the lever 94 has swung the carriage to the extreme right, preferably against the adjacent side wall, to permit all of the stop pins 50 to be brought beneath the pin return plate. By means of spring 79, the carriage 48 is then returned slightly to the left so that the first row of pins (designated 50ª for the sake of illustration in Fig. 10) clears the pin return plate and the first tooth 75 on the rack bar engages tooth 74 on ratchet 72. The engagement of the tooth 74 and ratchet 72 is clearly shown in Fig. 13. Consequently, the first row of pins 50 are free for actuation upon the first operation of the keys.

One of the features of the present invention is to provide an error key 110, the function of which is to shift the carriage 48 to its original position and return the projected stop pins 50 when an error is made, so that the operator may make a new selection of keys 62, when he desires for the printing operation, without being required to move the operating handle 11. This is accomplished by providing a lever 111 of the configuration shown in Figure 7 and furnishing a suitable pivotal mounting as at 112, so that a depression of the key 110 will swing the opposite end of the lever 111 into engagement with return lever 94. This engagement causes the return lever 94 to swing to the right in the same manner as when it was engaged through its latch 99 by cam 90. It is preferable to provide a spring 114 which has one end fixed at 115 and the other end attached to error key lever 111 at 116. As illustrated in Figure 7, the inner end 117 of lever 111 may be bent at right angles to obtain better engagement with return lever 94.

A further improvement in the art of check writers is provided in the present disclosure by the provision of a repeat key 118 which functions to hold the type segments in a fixed position, so that the selected printing characters will remain aligned with the printing line 7 for a number of printing operations. Such provision includes the repeat key 118 carried by a lever 119. The inner portion of repeat key 118 is enlarged as indicated at 120, and is furnished with aligned elongated slots 121 and 122. A pair of pins 123 and 124 ride in said slots, but preferably do not provide a pivotal mounting for lever 119. The upper portion of slot 121 is enlarged at 125 so as to hold lever 119 locked against accidental movement when actuated into its lower position. A stud 126 receives one end of a spring 127. The opposite end connects to pin 123. The tendency of spring 123 is to hold lever 119 in inoperative position. When repeat key 118 is depressed, however, in a slot 129 in the front of casing 1, the enlarged portion 120 thereof is bodily moved forward against the action of spring 127. The forward end of enlarged portion 120 has a transverse finger 130 furnished thereon for the purpose of engaging latch 99 and temporarily displacing it so that it will not be engaged by cam 90 on operating handle 11. Thus, any number of printing operations may be had with the type selected as long as latch 99 remains displaced. Latch 99 may be restored to its normal position by pulling the repeat key 118 outwardly in order to move the pins, relatively to the lower ends of slots 121 and 122.

It is preferable that a key locking arrangement be provided whereby only one key at a time may be operated. This guards against possible errors where more than one key at a time is apt to be depressed to cause an accidental selection of the wrong printing character. It is apparent that in a device of this type such an accident is possible, and, if occurring, will result in wasting the check being printed. More than one stop pin 50 of any one series or rows should not be raised by the key levers during the same operation, as only the front one will be engaged by the advancing type segment finger 40. Lying to the rear of the front stop pin, the second pin will have no function in limiting the rotative movement of the corresponding type segment in order to arrest its movement and bring the desired printing character thereon in alignment with the printing line 7. By referring to Figures 5 and 9, an angle iron in the form of a bracket 125 is secured at 126 to the base of the check writer. A plurality of locking cams 127 are pivoted at 128 to the vertical wall of bracket 125. Cams 127 are slightly enlarged at their upper ends as indicated at 129 and are adapted to swing back and forth on their pivots and contact with each other. At the left hand end, as seen in Figure 9, a roller 130 is fastened to bracket 125. The adjacent cam 127 contacts with the periphery of roller 130 when tilted in its direction. At the opposite end, a cam 132, having an outwardly extending finger 133, is also mounted on bracket 125. These cams are so arranged and spaced that only a single key lever 64 may be depressed. The depressed key lever will drop between the two adjacent cams spreading them apart in opposite directions. The cams on the opposite sides of both of these cams will then tightly contact with one another to prevent any of the other key levers 64 from being depressed at this time. As soon as the depressed lever is raised, then any one of the other key levers may be actuated, the spreading action of the two cams adjacent it occurring in order to lock the other cams against each other.

Mechanism is also employed to lock all the cams against spreading, and thereby to lock the keys 62 against operation, when the operating handle 11 is undergoing movement. That is to say, provision is made to permit operation of the keys 62 only after the completion of any prior operation of the check writer. In other words, the entire key board is locked against manipulation during movement of the operating handle. By referring to Figures 8 and 9, a lever 135, having an elongated slot 136, will be noted as being loosely suspended on operating handle 11. A cam 137 is fixed upon operating handle 11 adjacent to lever 135. Said lever 135 is provided with a shoulder 139 adapted to be engaged by a pin 140 on cam 137, when operating handle 11 is in its position of rest. A projecting foot 143 tends to move in the path of finger 133 on the end key locking cam 132 by the action of a spring 145 fastened at 146 to the lever 135 and to the housing at 147. This tendency is overcome, of course, by pin 140 engaging shoulder 139 on the lever. Hence, it will be seen that all the cams will be locked against each other, except during the engagement of the shoulder 139 by pin 140, which overcomes the action of the spring 145 tending to move foot 143 upwardly against finger 133 (and lock all the cams together).

In this position, projecting foot 143 on the opposite end of lever 135 is withdrawn from the path of finger 133 on the key locking cam 132. However, when the operating handle is moved forwardly from its full line position, as shown in Figure 3, the direction of movement being represented by the arrow in Figure 8, the pin is disengaged from shoulder 139. A spring 145 thereupon brings the lever 135 upwardly a distance in order that its foot 143 will interlock with cam finger 133 and throw all the cams into tight contact with one another to prevent their spreading. Lower end of lever 135 is furnished with an elongated slot 141 in which a guiding screw 142 rides. Spring 145 may be attached to the lever 135 at the point designated 146 and to any convenient point 147 within housing 1.

It is within the province of the present invention to provide a novel mode of operation with respect to action of the platen bar 150 cooperating with the printing characters on the type segments 10 during a printing operation and the action of a perforating bar 152 adaptive to cooperate with the check to perforate the payee's name, during the same movement of operating handle 11. That is to say, in the present disclosure, the mechanism of these two parts of the machine are so relative that as soon as a printing impression is made on the check, the perforating mechanism functions to cooperate with the check for the purpose of perforating the space where the payee's name is written.

This is accomplished by arranging integrally formed cams 153 and 154 (comprising cam 33) on operating handle 11 adapted to cooperate with a pair of rollers 155 and 156 carried on U frames 157 and 158, respectively. Frame 157 and 158 are pivotally mounted on a common shaft 159 suitably disposed within the housing. Frame 158 is adapted to have its horizontal portion comprise the platen bar 150, which will advance forwardly on the downward movement of the operating handle 11, to engage the check in the printing slot 5. By referring to Figure 6, is will be noted that the dwell 161 of cam 153 is substantially vertically positioned on shaft 11 and is adapted to move in the direction of the arrow shown in this figure during the downward movement of the operating handle. Dwell 161 will engage its roller 155 approximately when the operating handle reaches the limit of its downward stroke. The combined printing and embossing operation will then take place. Platen bar 150 swings toward the printing slot 5, passing through an opening 162 into the slot, and presses the check against the printing characters on the type segments 10. These printing characters are aligned directly to the rear of slot 7 in one of the walls forming the printing slot 5. Normally, the platen bar 150 will be held, by spring tension, away from the printing slot. Each vertical arm of bracket 157 is provided with a lug 164, between which and a second lug 165 a spring 166 is fastened. These springs 166 also tend to hold roller 155 in contact with the cam 153.

It will be remembered that the surfaces of the printing characters and the platen bar 150 are arranged to emboss the impression into the check. By providing this embossing of the check, the ink on the printing character will penetrate the fibre of the paper and make the impression of a permanent character. These surfaces are formed, in fact, to cut the figures into the paper by short parallel marks, preferably at an angle to the horizontal. By such an arrangement, the cutting does not destroy or mutilate the check, as will happen where the perforation comprises a close piercing of the paper.

The other bracket 158 has its horizontal portion in the form of a perforating bar 168. A plurality of projections 169 extend outwardly from the face of perforating bar and are so spaced as to enter a plurality of cooperating openings 170 provided in the lower end of bar 251 on the opposite side of printing slot 5. A slot 171 may be provided for permitting the perforating bar 168 to extend into printing slot 5.

Cam 154 has its dwell 172 disposed substantially at 180 degrees away from dwell 161 on cam 153. Roller 156 is preferably carried on the end of a bar 175 pivoted at 176 to the end of bracket 158. The opposite end of bar 175 is adapted to receive one end of a spring 177, which is attached at the other end to bracket 158. This end of bar 175 may be bifurcated, if so desired, and have a cross member 178 between the arms thereof. Normally, the spring 177 tends to hold the bar 175 against the cross member 178. As the operating handle 11 is moved downwardly at the beginning of its stroke, the dwell 161 on cam 153 will force the platen bar 150 forward, thereby causing the check to engage the printing characters which have been just aligned. By the time the platen bar 150 has operated, the dwell 172 on cam 154 will have forced the platen bar 150 forward. It will be observed that the arrangement herein disclosed permits the payee's name on the check to be perforated subsequent to the printing operation, but preferably the grip on the check is never released until both operations are completed.

It is preferable to provide a cushioning pad 180 within the housing to permit members 181 and 182 to strike against when the perforating bar 168 and the platen bar 150 are returned to their original position.

A pair of springs 185 tend to hold the perforating bar 168 in the position shown in Fig. 6. These springs are connected in a manner similar to springs 168 of the platen bar 150.

It is desirable that a complete stroke of the operating handle 11 is made each time the machine is operated. One of the advantages is that all the stop pins 50 will be in position for projection on a subsequent printing operation. If a complete stroke is required on each operation, it will cause the carriage 48 to return to starting position and to bring the stop pins under the pin return plate 105, thereby depressing all the previously projected stop pins. By this arrangement, the keys 62 are in a condition for a subsequent operation. The mechanism accomplishing this feature comprises the cam 137 and a cooperating cam lever 191. Cam lever 191 is pivotally mounted at 192 to the side of housing 1, one end of the lever being fastened to a spring 193 and the other end cooperating with the periphery of cam 137. If the operating handle 11 is moved to its full line position indicated in Figs. 3 and 8, or position of rest, the edge 195 strikes against a stop 196. It will be impossible to move the operating handle in a reverse direction after once starting forward. This action is due to the lower end 198 of cam lever 191 dragging along the periphery of cam 137. When cam 137 is moved in the direction of the arrow in Fig. 8, it cannot be started in the opposite direction until the lower end 198 of cam lever 191 rides over the adjacent end of the cam 137. Spring 193 tends to hold cam lever 191 in the direction of the movement of cam 137 to prevent the cam lever from turning the other way.

Printing slot 5 is substantially vertical which facilitates aligning the check and maintaining its alignment thereafter to align the check. A manually operable finger 198 is pivoted exteriorly of housing 1 on a rod 199 extending crosswise within the housing and carrying a pair of check setting fingers 200. These fingers are mounted to hold themselves frictionally in position whereby the check may be raised or lowered to any distance by moving the finger 198.

We claim:

1. In a check writer, the combination of an operating handle, a plurality of printing characters adapted to be brought into register with a printing line by movement of said operating handle, a combined platen and embossing bar, a frame for said bar operable by the movement of said operating handle to swing said bar into engagement with the check on the opposite side thereof for embossing the printed area of the check, a perforating bar, and a second frame also operable by the movement of said operating handle whereby to swing said perforating bar against the check for perforating a name space thereon.

2. In a check writer, the combination of an operating handle, a plurality of printing characters adapted to be brought into register with a printing line by movement of said operating handle, a combined platen and embossing bar, a perforating bar, means operable by the movement of said operating handle for moving said platen and embossing bar against the check during the printing operation, and means also operable by the movement of said operating handle to move said perforating bar against the check after the printing operation.

3. In a check writer, the combination of an operating handle, a plurality of type segments carried thereby, manually operable key means for actuating said type segments, each key being adapted for selectively positioning predetermined type on either of said segments when said handle is operated whereby to align predetermined printing characters with a printing line, and a platen bar cooperating with said printing characters for impressing all of the selected printing characters upon the check, the surfaces of said printing characters and platen bar being scored to cause the printing characters to cut into the printed area of the check.

4. In a check writer, the combination of an operating handle, a plurality of type segments mounted thereon, printing characters on said type segments, a plurality of manually operable key levers, a shiftable pin carriage supported over the ends of said key levers, whereby the operation of said key levers will selectively engage and release a predetermined number of a series of pins corresponding to the printing characters on said type segments, said pins serving as stops to limit the movement of said type segments by said handle and thereby to align the selected printing characters along a printing line, and a platen bar moving into cooperative relation with the printing characters for impressing the selected printing characters on the check.

5. In a check writer, the combination of an operating handle, a plurality of movable type segments carried thereby, printing characters on said type segments, a plurality of manually operable key levers, a shiftable carriage having a series of stop pins for each key lever adapted for selective actuation by said key levers whereby to limit the movement of said type segments and thereby to align certain printing characters along a printing line, and means for impressing the printing characters on the check.

6. In a check writer, the combination of an operating handle, a plurality of movable type segments carried thereby, printing characters on said type segments, a shiftable carriage mounted adjacent to said movable type segments, stops projectable from said carriage adapted to selectively limit the movement of certain of said type segments, according to the printing characters selected, and a plurality of pivotally mounted key levers adapted when actuated to engage and project certain of said stops whereby the movement of said operating handle will align the selected printing characters on said type segments for an impression on the check.

7. In a check writer, the combination of an operating handle, a plurality of movable type segments carried thereby, printing characters on said type segments, said type segments being normally movable by said operating handle, a carriage, a plurality of stops carried thereby and projectable into the path of said type segments whereby to limit the movement of any member of said type segments according to the selected printing characters thereon, thereby aligning these printing characters with a printing line, means for actuating said stops, and means for impressing the printing characters upon the check.

8. In a check writer, the combination of an operating handle, a plurality of type segments movable with said operating handle, printing characters on said type segments, a plurality of vertically movable and transversely shiftable stops corresponding in number to the number of printing characters on said type segments, means for selectively moving said stops in a position to restrain a continued movement of said type segments on said operating handle during movement thereof whereby to align the selected printing characters with a printing line, and means for impressing the selected printing characters on the check.

9. In a check writer, the combination of an operating handle, a plurality of type segments movable with said operating handle, printing characters on said type segments, a plurality of shiftable stops corresponding in number to the number of printing characters on said type segments, a key board, keys projecting from said key board, levers operable by said keys, each lever functioning to selectively move certain of said stops in a position to restrain continued movement of corresponding type segments, depending upon the printing characters thereon which are selected to align with a printing line, and means for impressing the selected printing characters on the check.

10. In a check writer, the combination of an operating handle, a plurality of type segments movable with said operating handle, printing characters on said type segments, a plurality of transversely shiftable stops adapted to be brought into the path of certain of said type segments whereby to align selected printing characters on these type segments with a printing line, means for actuating said stops, and means for impressing the selected printing characters on the check.

11. In a check writer, the combination of an operating handle, a plurality of type segments movable with said operating handle, printing characters on said operating handle, a plurality of transversely shiftable stops adapted to be brought into the path of certain of said type segments whereby to align selected printing characters on these type segments with a printing line, a plurality of key actuated levers each adapted to actuate a series of said stops, depending upon the printing characters which are selected, the actuation of said stops by said key actuating levers automatically shifting said stops transversely with respect to said type segments, and means for impressing the selected printing characters on the check.

12. In a check writer, the combination of type carrying members having printing characters thereon, and means for aligning said printing characters with a printing line comprising an operating handle, mechanism for selectively limiting the movement of said type carrying members, key actuated levers adapted to operate said mechanism, and means for preventing the actuation of more than one key lever at a time.

13. In a check writer, the combination of type carrying members having printing characters thereon, an operating handle adapted to move said type carrying members into a printing position, mechanism for aligning the printing characters for selective registration along a printing line when said type carrying members are moved, key actuated means for operating said mechanism, and means for preventing the actuation of more than one key at a time.

14. In a check writer, the combination of type carrying members having printing characters thereon, an operating handle adapted to move said type carrying members into a printing position, a plurality of stop pins adapted to project and selectively limit the movement of said type carrying members, key means for operating said stop pins, and means for locking said key means against actuation during the movement of said operating handle.

15. In a check writer, the combination of type carrying members having printing characters thereon, key actuated mechanism for selectively aligning certain of said printing characters along a printing line, and locking mechanism for preventing the movement of said key actuating mechanism during the impression of the printing characters on the check.

16. In a check writer, the combination of type carrying members having printing characters thereon, an operating handle, key actuated mechanism for selectively aligning certain of said printing characters along a printing line upon the movement of said operating handle, and locking mechanism cooperating with said handle whereby to lock said key actuated mechanism during said movement of the handle.

17. In a check writer, the combination of type carrying members having printing characters thereon, an operating handle, mechanism for selectively aligning certain of said printing characters along a printing line upon the movement of said operating handle, operating means for actuating said mechanism, and locking means cooperating with said operating means for permitting the single selection of a printing character at any one time.

18. In a check writer, the combination of an operating handle, a plurality of type segments movable by said operating handle, printing characters on said type segments, a plurality of keys adapted for actuation whereby to effect a predetermined positioning of the type segments when moved by said operating handle, thereby selectively aligning certain of said printing characters with a printing line for a printing operation, and mechanism including a lever and a cam adapted to be displaced by said lever; functioning to hold said type segments in their predetermined position to permit a repetition of the printing operation.

19. In a check writer, the combination of an operating handle, a plurality of type segments movable by said operating handle, printing characters on said type segments, a plurality of keys adapted for actuation whereby to effect a predetermined positioning of the type segments when moved by said operating handle, thereby selectively aligning certain of said printing characters with a printing line for a printing operation, and key mechanism including a displaceable cam element functioning to allow said type segments to remain in their predetermined position to permit a repetition of the printing operation.

20. In a check writer, the combination of an operating handle, a plurality of type segments having printing characters thereon adapted to be brought into alignment with a printing line by the movement of said operating handle, a plurality of keys, cooperating mechanism for effecting a predetermined positioning of said type segments whereby to selectively align the printing characters corresponding to the keys which are actuated, means operated by said handle for automatically restoring said type segments after the printing operation and means operated at will for engaging said means for temporarily nullifying the actuation of said keys and cooperating mechanism whereby to correct an erroneous actuation of said keys.

21. In a check writer, the combination of an operating handle, a plurality of type segments mounted for movement by said operating handle, a plurality of keys and cooperating mechanism actuated by said keys for predetermining the positioning of said type segments by the movement of said operating handle, means actuated by said handle at the end of its stroke for returning said type segments to their original position at the end of the printing operation, and an error key functioning when actuated to temporarily multiply the actuation of said cooperating mechanism by said keys, said error key serving to engage said means instead of said handle for correcting at will an erroneous operation of said keys.

22. In a check writer, the combination of an operating handle, a plurality of type carrying members movable to printing position by said operating handle, a platen bar adapted to advance toward said type carrying members to engage the check at the opposite side thereof whereby to effect the impression of the type on the check, said type carrying members returning to their normal position after the printing operation on the return stroke of said operating handle, and cooperating means arranged to prevent said return stroke of said operating handle before the completion of the printing operation.

23. In a check writer, the combination of an operating handle, type carrying segments mounted on said operating handle and normally moving therewith, a plurality of printing characters on each of said type carrying segments, a movable carriage adjacent to said type carrying segments, stop pins projectable from said carriage whereby to selectively limit the movement of certain of said type carrying segments, means for actuating said stop pins, said carriage having an upper and lower wall within openings therein for carrying said stop pins, the lower ends of said stop pins being bifurcated to impart resiliency to the legs thereof which result from the bifurcating formation, one of the legs of each stop pin having a series of notches along its outer edge for cooperating with the edge of the opening in said lower wall whereby to limit the movement of each pin in either direction.

24. In a check writer, the combination of an operating handle, a plurality of type carrying members normally movable with said operating handle, a frame fixed to said operating handle, a spring connection between each of said type carrying members and said frame, a plurality of stop pins adapted to be selectively brought into the path of said type carrying members whereby to limit the movement of the latter when said operating handle is operated to align predetermined printing characters on said type carrying members with a printing line, said frame engaging with and returning said type carrying members to normal position after the printing operation.

25. In a check writer, the combination of an operating handle, a plurality of printing characters adapted to be brought into register with a printing line by the movement of said operating handle, an inking roller, a spring tending to hold said inking roller against said printing characters, and a cam member on said operating handle and controlled thereby, said cam member opposing the action of said spring after the printing operation to move said inking roller out of contact with said printing characters.

26. In a check writer, the combination of an operating handle, a plurality of printing characters adapted to be brought into register with a printing line by the movement of said operating handle, a spring pressed inking roller normally tending to move against said printing characters, and a cam member opposing the movement of said inking roller on the return stroke of said operating handle.

27. In a check writer, the combination of an operating handle, a plurality of printing characters movable into printing position by the movement of said operating handle, a pivotally mounted inking member, a spring for normally holding said inking roller against said printing characters, and a cam member for moving said inking roller away from said printing characters on the return stroke of said operating handle.

28. In a check writer, the combination of an operating handle, a plurality of printing characters movable into printing position by the movement of said operating handle, an inking roller, a cam suspended from said operating handle for controlling the position of said inking roller, and a pin movable by said operating handle for actuating said cam.

29. In a check writer, the combination of an operating handle, a plurality of printing characters adapted to be selectively brought into register with a printing line, an inking roller, a cam suspended from said operating handle, said cam having an irregular engaging surface to vary the position of said inking roller relative to said printing characters, and a pin movable by said operating handle in a slot provided in said cam for actuating the same.

30. In a check writer, the combination with a key board, keys projecting from said key board, pivotally mounted key levers adapted for actuation by said keys, said key levers having their inner ends substantially in alignment with each other, a plurality of series of stop pins actuated by the inner ends of said key levers, an individual type carrying member for each series of stop pins, an operating handle for moving the type carrying members into printing position, and means for shifting said stop pins to permit selective actuation of any one thereof in any series by said key levers.

31. In a check writer, the combination with a plurality of movable type segments having printing characters provided thereon, and a plurality of stop pins for selectively limiting the movement of said type segments whereby to selectively align the desired printing characters thereon with a printing line, a carriage having perforated plates for carrying said stop pins, the lower ends of said stop pins being longitudinally slotted and having an edge of notched formation so that a predetermined force applied upwardly at the bottom thereof will move each pin a limited distance upwardly without causing it to be completely displaced.

32. In a check writer, the combination with a plurality of keys, pivotally mounted key levers adapted for actuation by said keys, a plurality of series of stop pins actuated by said key levers, an individual type carrying member for each series of stop pins, an operating handle for moving said type carrying members into printing position, the inner ends of said key levers adapted selectively to engage any stop pin of each series for selectively bringing any printing character of said type carrying members into said printing position.

33. In a check writer, the combination with a plurality of keys, a plurality of stop pins actuated by said keys, a shiftable carriage for said stop pins, type carrying members, an operating handle for moving said type carrying members into printing position, means for advancing said shiftable carriage to permit said keys to selectively actuate said stop pins for selectively bringing printing characters of said type carrying members into said printing position upon operation of said operating handle, mechanism for returning said carriage to normal position upon completion of the printing operation and means for disabling said return mechanism to permit repeat printing operations of the printing characters selected.

34. In a check writer, the combination with a plurality of keys, a series of transversely shiftable stop pins for each key, a corresponding type carrying member for each series of stop pins, said stop pins being actuated by said keys whereby predetermined printing characters on said type carrying members are selectively brought into printing position, means for normally returning said shiftable stop pins for a subsequent printing operation, and a repeat key having means associated therewith for disabling said return means whereby any number of printing operations may be obtained from a single selection of printing characters.

35. In a check writer, the combination with an operating handle, a plurality of type carrying members having printing characters thereon, a plurality of stop pins selectively limiting the movement of said type carrying members for aligning certain of said printing characters along a printing line upon the movement of said operating handle, means for returning said stop pins at the end of the stroke of said operating handle, said means including a pivotally mounted spring latch normally engageable by a cam on said operating handle, and a repeat key lever adapted to displace temporarily said spring latch whereby to permit repetition of the selected printing impression upon subsequent movements of said operating handle.

36. In a check writer, the combination with an operating handle, a plurality of type carrying members having printing characters thereon, a plurality of shiftable stop pins, key levers adapted for actuation whereby to effect selective positioning of said stop pins to limit the movement of said type carrying members and thereby selectively align certain of said printing characters along a printing line, means for returning said shiftable stop pins upon completion of the printing operation, said means including a pivotally mounted bar adapted for movement on the return stroke of said operating handle, and an error key lever arranged to swing said bar independently of the movement of said operating handles.

37. In a check writer, the combination with an operating handle, a plurality of type carrying members having printing characters thereon, a plurality of shiftable stop pins, key levers adapted for actuation whereby to effect selective positioning of said stop pins to limit the movement of said type carrying members and thereby selectively align certain of said printing characters along a printing line, means for returning said shiftable stop pins upon completion of the printing operation, said means including a bar adapted for swinging movement on the return stroke of said operating handle, a pivotally mounted spring latch carried by said bar, and a cam member on said operating handle adapted to displace said latch on the forward stroke but to engage the same on the return stroke of said handle.

38. In a check writer, the combination with an operating handle, a plurality of type carrying members having printing characters thereon, a plurality of shiftable stop pins, key levers adapted for actuation whereby to effect selective positioning of said stop pins to limit the movement of said type carrying members and thereby selectively align certain of said printing characters along a printing line, means for returning said shiftable stop pins upon completion of the printing operation, said means including a pivotally mounted bar, a spring latch carried by said bar capable of displacement by said operating handle upon the forward stroke but engageable thereby to swing said bar upon the return stroke, and a repeat key lever arranged to displace said spring latch to prevent engagement by said operating handle during the return stroke.

FRANK T. BOYDSTON.
EDWIN W. WILSON.